(12) United States Patent
Sasaki

(10) Patent No.: US 7,545,122 B2
(45) Date of Patent: Jun. 9, 2009

(54) CONTROL METHOD OF GENERATOR

(75) Inventor: Koji Sasaki, Tatebayashi (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 11/902,315

(22) Filed: Sep. 20, 2007

(65) Prior Publication Data
US 2008/0116857 A1    May 22, 2008

Related U.S. Application Data

(62) Division of application No. 10/530,654, filed as application No. PCT/JP03/12693 on Oct. 3, 2003, now Pat. No. 7,292,012.

(30) Foreign Application Priority Data

Oct. 11, 2002  (JP) .............................. 2002-298357
May 19, 2003  (JP) .............................. 2003-139878

(51) Int. Cl.
*H02P 9/00* (2006.01)
(52) U.S. Cl. .......................................... 322/24; 322/25
(58) Field of Classification Search .................. 322/24, 322/25
See application file for complete search history.

(56) References Cited

U.S. PATENT DOCUMENTS

| | | | |
|---|---|---|---|
| 5,656,922 A | 8/1997 | LaVelle et al. | |
| 5,751,069 A | 5/1998 | Rajashekara et al. | |
| 5,770,909 A | 6/1998 | Rosen et al. | |
| 5,942,865 A | 8/1999 | Kim | |
| 6,359,421 B1 | 3/2002 | Mueller et al. | |
| 6,720,753 B2 | 4/2004 | Kikuchi et al. | |
| 6,787,931 B2 | 9/2004 | Nakagawa et al. | |
| 6,812,675 B2 * | 11/2004 | Okamoto et al. | .............. 322/28 |
| 6,847,194 B2 * | 1/2005 | Sarlioglu et al. | .............. 322/10 |
| 6,894,402 B2 * | 5/2005 | Dubus et al. | .............. 290/40 C |

(Continued)

FOREIGN PATENT DOCUMENTS

EP    1 067 670    1/2001

(Continued)

*Primary Examiner*—Nicholas Ponomarenko
*Assistant Examiner*—Iraj A Mohandesi
(74) *Attorney, Agent, or Firm*—Wenderoth, Lind & Ponack, L.L.P.

(57) ABSTRACT

When drive control of a generator is performed, PWM control of a switching circuit comprising an FET and a diode connected to the opposite ends of a winding is performed. In the vicinity of a moment in time Lmax where the winding has a maximum inductance L, an alternating mode for repeating a supply mode and a reflux mode alternately is performed through PWM control. After the alternating mode is performed, the reflux mode is performed temporarily in order to increase the quantity of current, and then a regenerative mode is performed. The regenerative mode is performed by increasing the current level as much as possible when the reflux mode is started while suppressing the brake force of the rotor in the alternating mode. From a position advancing in angle by a time Tah from the moment in time Lmax where the winding has a maximum inductance L, a first alternating mode $C_1$ for repeating the supply mode P and the reflux mode Q alternately is performed. After the first alternating mode $C_1$ is performed, a second alternating mode $C_2$ for repeating the reflux mode Q and the regenerative mode R alternately is performed.

11 Claims, 8 Drawing Sheets

U.S. PATENT DOCUMENTS 6,998,726 B2 * 2/2006 Sarlioglu et al. ............... 290/31
7,294,991 B2 * 11/2007 Kimura et al. ................. 322/37

FOREIGN PATENT DOCUMENTS

| JP | 6-178573 | 6/1994 |
| JP | 7-308093 | 11/1995 |
| JP | 2000-299996 | 10/2000 |

* cited by examiner

CONTROL METHOD OF GENERATOR

This application is a divisional of U.S. application Ser. No. 10/530,654, filed Apr. 7, 2005 now U.S. Pat. No. 7,292,012, which is a national stage application of International application No. PCT/JP2003/012693, filed Oct. 3, 2003, now allowed.

TECHNICAL FIELD

The present invention relates to a controlling method of a generator which has an SR motor (Switched Reluctance Motor) structure.

BACKGROUND ART

Recently, in an electric automobile or a so-called hybrid car in which a motor and an engine are commonly used; it has been discussed not to use an expensive permanent magnet, but to use an SR motor that has a simple and rigid structure, and excels in a high speed rotation and an environmental resistance. Generally, the SR motor has a construction in which a rotor made of magnetic steel sheet is disposed rotatably coaxially with a stator inside the stator in which a coil is wound around. Salient poles projecting inward are formed on an inner peripheral side of the stator, and a coil is wound around on this salient pole to form a winding. Salient poles projecting outward are formed radially on an outer periphery of the rotor, and adapted to approach, oppose and separate from the salient poles of the stator in association with the rotation of the rotor. The salient poles of the rotor and the salient poles of the stator are set to even numbers so that both the salient poles of the rotor and the salient poles of stator do not have a multiple relation with each other with the result that when certain salient poles of the stator and the rotor are opposed, the other salient poles of the stator and the rotor are deviated at the positions. That is, when the number of salient poles of the rotor is, for example, four, the number of salient poles of the stator is set to six, and when the number of salient poles of the rotor is six, the number of salient poles of the stator is set to eight.

In such an SR motor, when current flows, for example, to a pair of the opposed windings of the stator, a magnetic flux directed from the salient pole of the stator toward the salient pole of the rotor is generated. Thus, the salient pole of the rotor is attracted to the salient pole of the stator to generate a torque at the rotor. As described above, the salient poles of the stator and the rotor are set so that when certain salient poles are opposed, a deviation arises at the other salient poles. Therefore, the winding of the salient pole set to the state that the other salient poles are deviated, is applied with power, the salient poles of the deviated state are attracted, and thus the rotor is rotated. When this operation is continuously conducted, the salient poles of the rotor are attracted to the salient poles of the stator continuously, and the rotor is rotated around its axis.

On the other hand, such an SR motor can be used as a generator, for example, Japanese Patent Application Laid-Open Publication No. 2001-57795 and Japanese Patent Application Laid-Open Publication No. 2001-78490, disclose a control system for preventing overcurrent at a power generation time and thereby generating electricity in a high efficiency. In the Publication No. 2001-57795, a maximum amount of current, when a power regeneration is conducted at present time, is predicted and calculated based on a rotational speed of the rotor or on an amount of supply current during a supply mode for using the SR motor as a motor by supplying a power from a battery. When the maximum amount of current reaches a predetermined rate, a regenerative mode in which an electromotive force generated in the winding is recovered in the battery is performed.

In the Publication No. 2001-78490, in addition to the above-mentioned supply mode and regenerative mode, a reflux mode in which both ends of the winding are set to the same potential, is set. At the reflux mode time, the winding is short circuited, and hence winding current increases. A winding current value is always monitored. After the supply mode is switched to the regenerative mode, and when the winding current value reaches a lower limit value, the regenerative mode is switched to the above-mentioned reflux mode. In the reflux mode, a current value rises, and when the current value reaches an upper limit value, the reflux mode is again switched to the regenerative mode. This switching of the regenerative mode and the reflux mode is continued until the rotor becomes a predetermined rotary angle. Thus, the winding current value is controlled between the upper limit value and the lower limit value so as to prevent the winding current from becoming large in a projecting manner.

Meanwhile, in the above-mentioned control system, in an inductance reducing region ($dL/d\theta < 0$), the current is controlled to fall within a predetermined range by means of the alternating mode and the reflux mode, and thereafter regenerative current flows. Since the current flowing in the range of $dL/d\theta < 0$ affects a braking force to the rotor, it is necessary to suppress a control current value in the alternating/reflux mode to raise a power generating efficiency. However, when this control current value is suppressed to a small value, the regenerative current value is also reduced, and hence there is a problem that it becomes difficult to assure a necessary amount of power generation. In order to control a motor current, a sensor for detecting the current value and a feedback control circuit which is operated at a high speed are necessary. Hence, there is a problem that the apparatus becomes expensive. An object of the present invention is to improve a power generating efficiency of a generator having an SR motor structure.

SUMMARY OF THE INVENTION

A controlling method of a generator according to the present invention having a stator that has a plurality of salient poles, a rotor that has a plurality of salient poles of a number (quantity) different from the salient poles of the stator, and a winding wound around the stator, comprises: executing a reflux mode at both ends of the winding set to the same potential after executing a supply mode for supplying a power from a power source to the winding; and, after the reflux mode, executing a regenerative mode for recovering an electromotive force generated in the winding to the power source.

In the present invention, after the supply mode is conducted, the reflux mode is executed, and thereafter the regenerative mode is carried out. In this manner, the regenerative mode is executed after the reflux mode is performed, the amount of current is raised once by the reflux mode after a supply mode is conducted, the regenerative mode is then carried out, and an amount of the regenerative energy in the regenerative mode can be increased, and hence the power generating efficiency is improved.

Further, another controlling method of a generator according to the present invention having a stator that has a plurality of salient poles, a rotor that has a plurality of salient poles of a number different from the salient poles of the stator, and a winding wound around the stator, comprises: executing an alternating mode for alternately repeating a supply mode for supplying a power from a power source to the winding and a reflux mode for setting both ends of the winding to the same potential; and, after the alternating mode, further executing the reflux mode, thereafter executing a regenerative mode for recovering the electromotive force generated in the winding to the power source.

In the present invention, an average current value in a region where the brake force by the winding current is generated is being suppressed by the alternating mode, and the regenerative mode is executed after the reflux mode is performed to raise the current value. Here, a rising trend of the amount of current in the reflux mode is determined according to the current value and the rotational speed of the rotor at the reflux mode starting time. If they are not sufficiently large, the amount of current does not increase at the reflux mode time. When the increase in the current at the reflux mode time is not sufficient, the amount of the regenerative energy in the regenerative mode cannot be secured, and the power generating efficiency decreases. Meanwhile, when the winding current is controlled to increase the amount of current at the reflux mode starting time, the brake force increases accordingly.

In the controlling method of the present invention, the alternating mode for alternatively repeating the supply mode and the reflux mode is executed, and after this alternating mode, the reflux mode is further performed, and thereafter the regenerative mode is carried out. Therefore, the amount of current can be increased at the reflux mode starting time while suppressing the brake force in the alternating mode, the brake force and the amount of the regenerative energy are controlled in a well-balanced manner, and the power generating efficiency can be improved.

In the controlling method of the generator, the generator is controlled by a switching circuit having a switching element and a diode connected to both ends of the winding, and the switching element is PWM controlled, to thereby execute the alternating mode.

In the controlling method of the generator, the voltage of the power source is detected, and a continuation time of one or both of the supply mode and the reflux mode or one or both of the alternating mode and the reflux mode may be controlled based on the voltage value. Thus, the overcharging of the power source in the regenerative mode can be prevented.

Furthermore, another controlling method of a generator according to the present invention having a stator that has a plurality of salient poles, a rotor that has a plurality of salient poles of a number different from the salient poles of the stator, and a winding wound around the stator, comprises: executing a first alternating mode for alternately repeating a supply mode for supplying a power from a power source to the winding and a reflux mode for setting both ends of the winding to the same potential; and after the first alternating mode, executing a second alternating mode for alternately repeating the reflux mode and the regenerative mode for recovering the electromotive force generated in the winding to the power source.

In the present invention, since the second alternating mode is provided after the first alternating mode and the reflux mode and the regenerative mode are repeated in this second alternating mode, a rise of the current in the reflux mode can be suitably suppressed in the regenerative mode. Therefore, the regenerative current rate can be secured to the maximum while suitably suppressing the maximum current rate, and power generation in a well-balance manner between them can be performed. Accordingly, a load on a power device is reduced, an element having a large capacity is not required, and its cost can be reduced. Further, a winding current rate can be suppressed without adding a current sensor, a high-speed comparator or the like, and an increase in cost due to the increase in the number of components can be prevented.

In the controlling method of the generator, the generator is controlled by a switching circuit having a switching element and a diode connected to both ends of the winding, and the switching element is PWM controlled to thereby execute the first and second alternating modes.

In the controlling method of the generator, the first alternating mode may be started before the time point at which the inductance of the winding becomes maximum. The first alternating mode is advanced from a time point at which an inductance becomes maximum in this manner, the continuation time of the first alternating mode is lengthened. Therefore, since the current rate at the second alternating mode starting time increases and a power generation rate can be increased, the present method is particularly effective in the case where the power generation rate is insufficient. Meanwhile, since the increase in the current rate in the second alternating mode is suppressed, even when the winding current rate is excessively increased due to a lead angle, the current rate can be suitably suppressed. Therefore, according to the present invention, the increase in the current rate due to the lead angle and the suppression of the current rate in the second alternating mode are combined in a well-balanced manner, so that it is possible to realize a preferable control state capable of sufficiently maintaining a regenerative current rate while suppressing the maximum current value.

DETAILED DESCRIPTION OF THE INVENTION

Embodiment 1

Now, the embodiments of the present invention will be described in detail with reference to the accompanying drawings.

Figure 1:
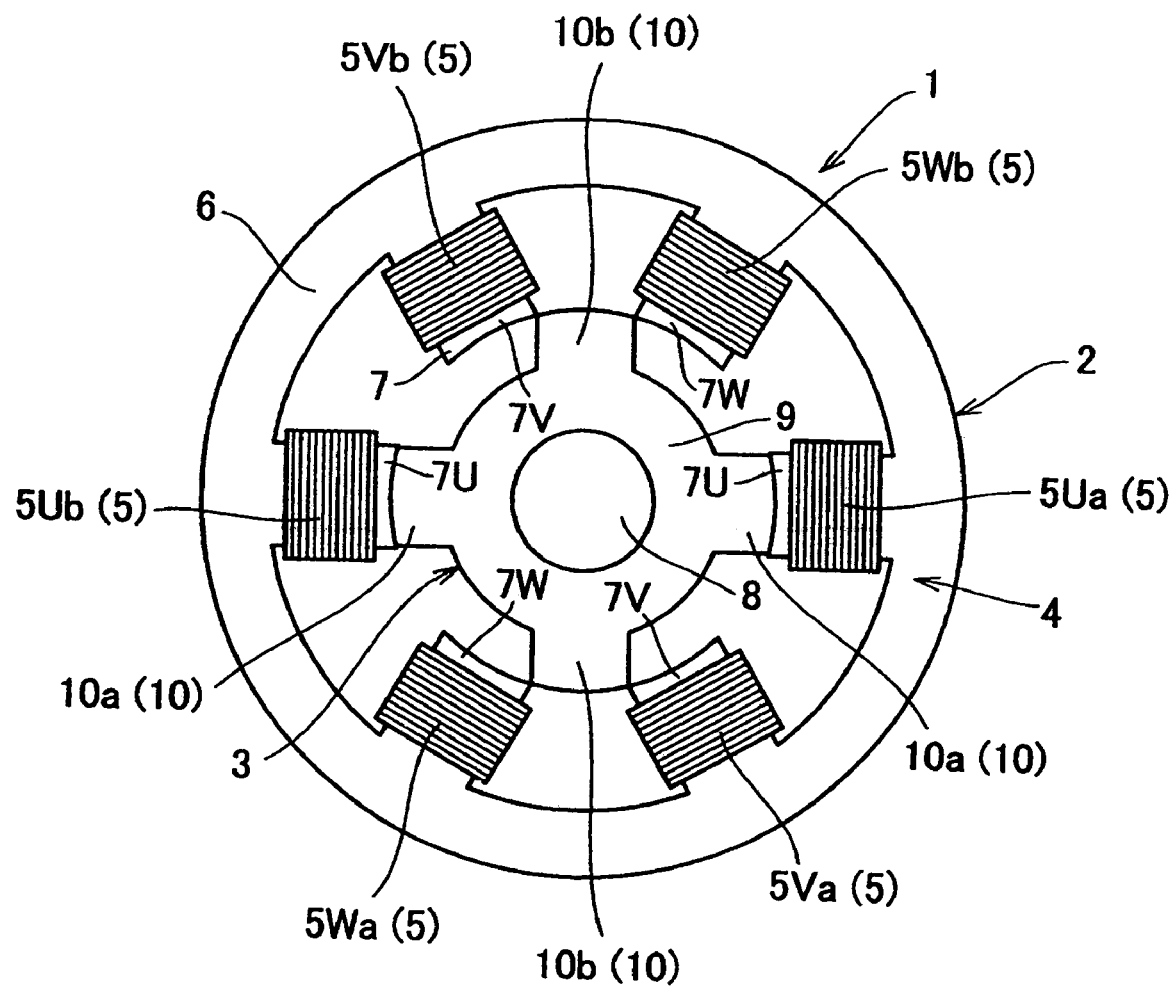
FIG. 1 is an explanatory view showing a construction of a generator applied with a controlling method of an embodiment 1 of the present invention.

FIG. 1 is an explanatory view showing a construction of a generator applied with a controlling method of an embodiment 1 of the present invention. A generator 1 of FIG. 1 has a structure similar to a so-called SR motor, and comprises a stator 2, and a rotor 3 that is rotatably arranged inside the stator 2. The stator 2 is contained in a housing (not shown). The generator 1 is driven, for example, by an automobile engine. In this case, the rotor 3 is coupled to a crankshaft of the engine. The generator 1 of this embodiment is an inner rotor type, but may be an outer rotor type in which the positional relationship between the stator and the rotor is opposite.

The stator 2 has a stator core 4 and a plurality of windings 5. The stator core 4 is formed by laminating a plurality of magnetic steel sheets, and fixed in the housing. The stator core 4 has a cylindrical yoke 6 and six salient poles 7 at the inside of the yoke 6. The salient poles 7 inwardly project toward the radial direction of the yoke 6. The winding 5 is formed by winding a coil on each salient pole 7. The generator 1 is a three-phase generator, and the winding 5 has U-phase, V-phase and W-phase windings 5Ua, 5Ub, 5Va, 5Vb, 5Wa, and 5Wb. A pair of opposed windings 5 are connected in series to construct the respective phase winding sets 5U, 5V and 5W.

The rotor 3 has a shaft 8 and a rotor core 9. The shaft 8 is rotatably supported by bearings provided in the housing. The rotary angle of the shaft 8 is detected by a shaft position sensor 17 (refer to FIG. 2). A rotational speed of the rotor 3 can be calculated from a period and a pulse width of the shaft position sensor 17. Incidentally, if a rotational speed detecting sensor is separately provided, it may be utilized.

The rotor core 9 is formed by laminating a plurality of magnetic steel sheets, and fixed to the shaft 8. Four salient poles 10 are provided on an outer peripheral side of the rotor core 9. The rotor 3 is coaxially inserted and placed in the stator 2, and a predetermined gap is formed between the salient pole 10 and the salient pole 7 of the stator 2.

Such a generator 1 can be used as an SR motor by sequentially supplying current to windings 5 of the respective phases. Here, when the current flows to the winding 5, a magnetic flux is generated directed from the salient pole 7 of the stator 2 to the salient pole 10 of the rotor 3. For example, when the windings 5Va, 5Vb are applied with power in a state shown in FIG. 1, the salient poles 10b of the rotor 3 located near the windings are attracted, a torque is generated, and hence the rotor 3 moves in a counterclockwise direction. When the salient pole 7V of the stator 2 is opposed to the salient pole 10b of the rotor 3, a positional displacement arises between the salient poles 7W and 10a since the stator 2 has six poles and the rotor 3 has four poles.

When the windings 5Wa, 5Wb of the salient pole 7W are applied with power, then the salient pole 10a is attracted to the salient pole 7W. At this time, a positional displacement arises between the salient poles 7U and 10b. Next, when the windings 5Ua, 5Ub of the salient pole 7U are applied with power, the salient pole 10b is attracted to the salient pole 7U. That is, when the windings 5 of the respective phases are sequentially applied with power, the salient poles 10 of the rotor 3 are continuously attracted to the salient poles 7 of the stator 2, the rotor 3 rotates with the shaft 8 in the stator 2, and operates as the SR motor.

Figure 2:
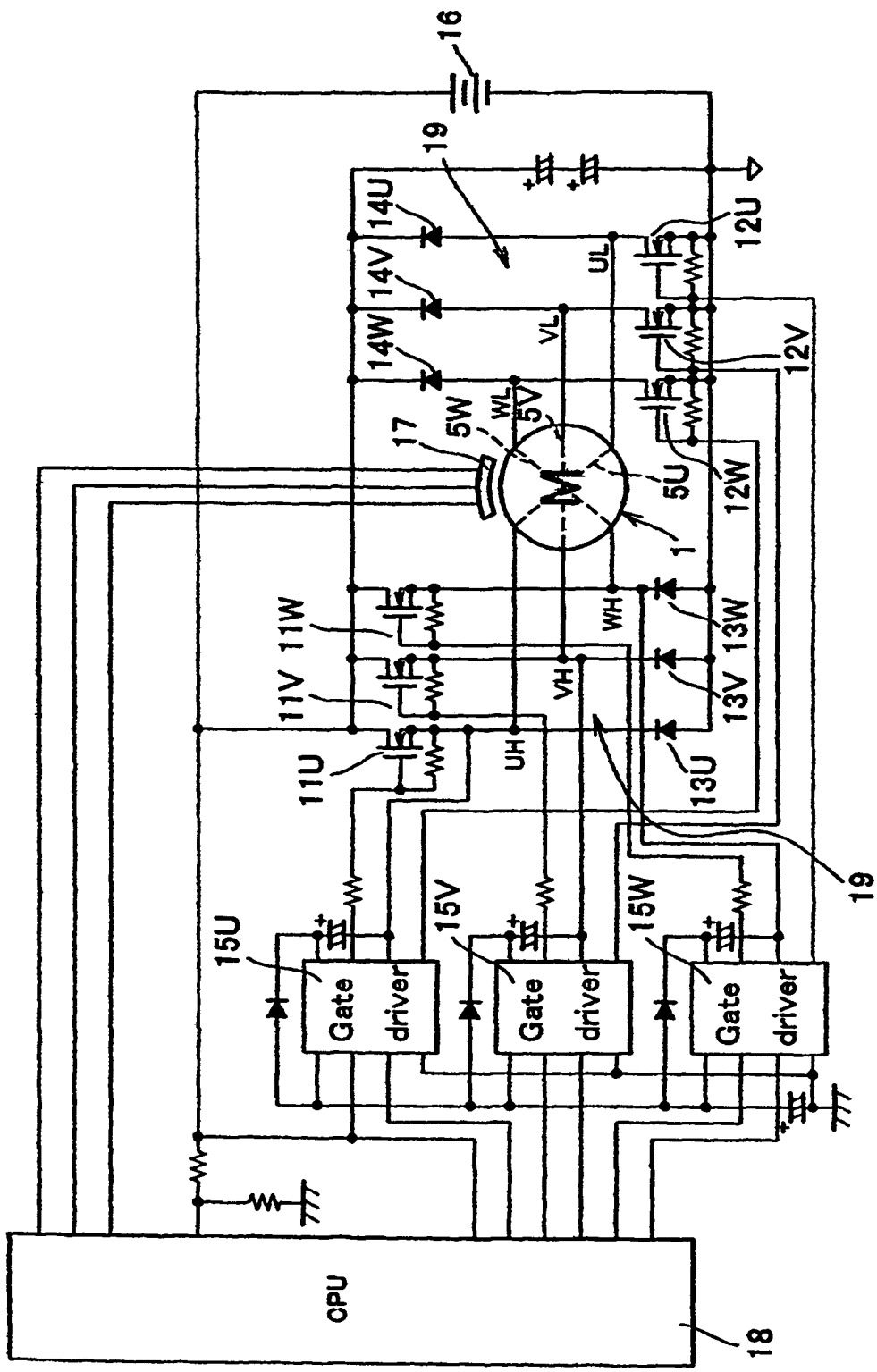
FIG. 2 is a circuit diagram showing a construction of a drive circuit in the generator of FIG. 1.

FIG. 2 is a circuit diagram showing a construction of a drive circuit in the generator of FIG. 1. As shown in FIG. 2, switching circuit 19 having FETs (switching elements) and diodes is connected to both ends of the winding sets 5U, 5V and 5W of the respective phases. The first end sides (HI side: UH, VH and WH) of the winding sets 5U, 5V and 5W are connected to a positive (+) electrode of a battery (power source) 16 through the FETs 11U, 11V and 11W, respectively and also connected (grounded) to a negative (−) electrode of the battery 16 through the diodes 13U, 13V and 13W, respectively. The other (second) end sides (LO side: UL, VL and WL) of the winding sets 5U, 5V and 5W are connected to the positive electrode of the battery 16 through the diodes 14U, 14V and 14W, and also connected to the negative electrode of the battery 16 through the FETs 12U, 12V and 12W, respectively.

The FETs 11 and 12 are controlled by gate drivers 15U, 15V and 15W. The gate drivers 15U, 15V and 15W are connected to a CPU 18, and controlled by the CPU 18. The generator 1 further has a shaft position sensor 17 which can detect the rotary angle of the shaft 8. The output of the shaft position sensor 17 is inputted to the CPU 18. The CPU 18 controls the gate drivers 15U, 15V and 15W based on the detection signal, and suitably applies power to the winding sets 5U, 5V and 5W. The CPU 18 calculates the rotational speed of the shaft 8 from the signal of the shaft position sensor 17. Incidentally, a voltage of the battery 16 is monitored by the CPU 18 at all times.

Figure 3:
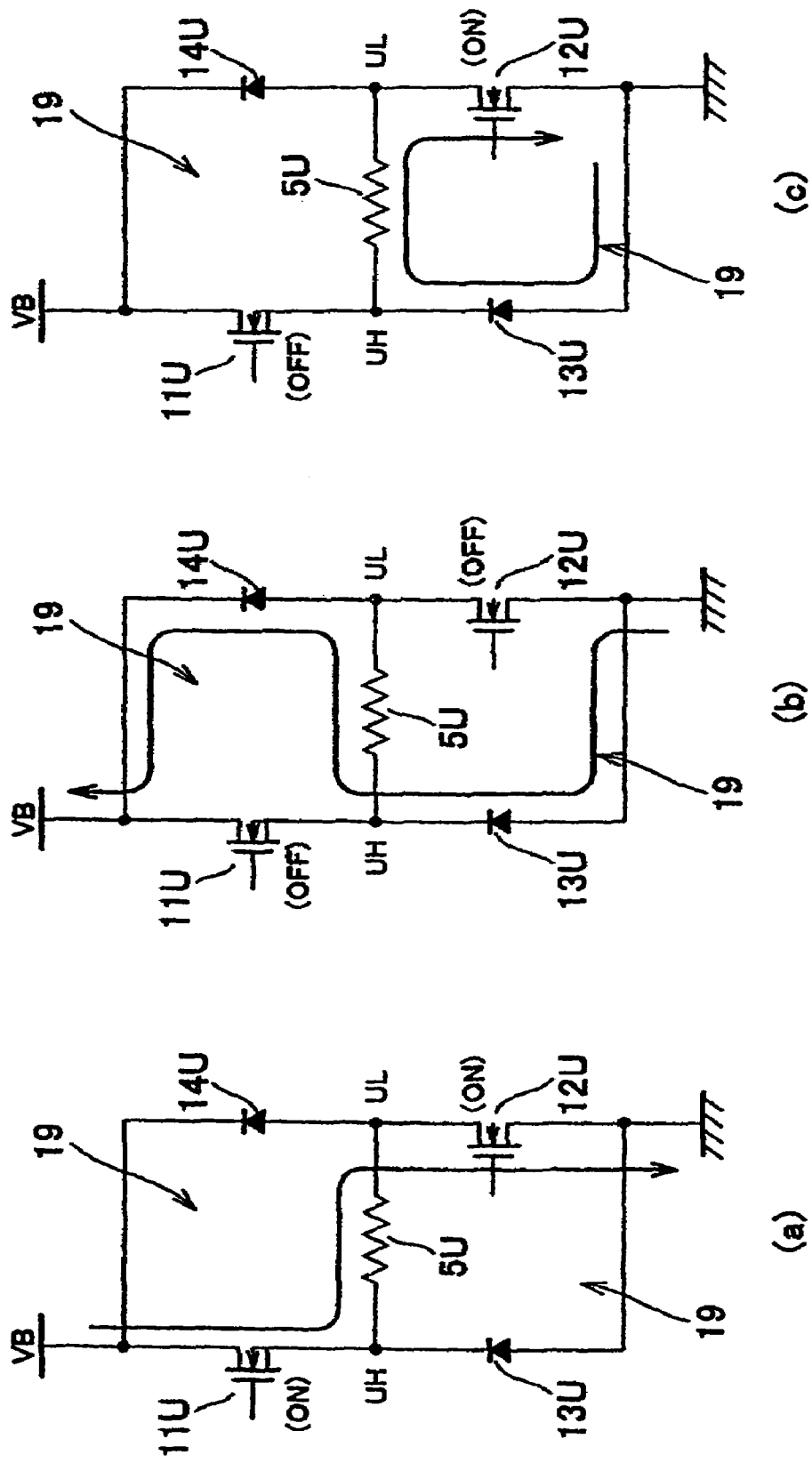
FIG. 3 is a circuit diagram showing only a U-phase portion extracted from the circuit diagram of FIG. 2; wherein (a) shows a supply mode, (b) shows a regenerative mode, and (c) shows a reflux mode in the controlling method of the embodiment 1.

FIG. 3 is a circuit diagram showing only the U-phase portion extracted from the circuit diagram of FIG. 2, FIG. 3(a) shows the supply mode, FIG. 3(b) shows the regenerative mode, and FIG. 3(c) shows the reflux mode. Incidentally, the following description will be made only for the U-phase, and the V-phase and the W-phase are operated similarly to the U-phase. In the controlling method, the generator 1 is driven by three control modes of the supply mode, the regenerative mode and the reflux mode. The supply mode supplies power to the winding set 5U, the regenerative mode recovers an electromotive force generated in the winding set 5U, and the reflux mode short circuits both ends of the winding set 5U as the same potential.

In the supply mode, as shown in FIG. 3(a), the FETs 11U and 12U are turned ON simultaneously. In this mode, a current flows in a route through the FET 11U, the winding set 5U and the FET 12U. Thus, the battery 16 supplies power to the windings 5Ua, 5Ub of the winding set 5U, the salient poles 10 of the rotor 3 are attracted to the salient poles 7U of the stator 2, and hence the rotor 3 is rotated or braked.

In the regenerative mode, as shown in FIG. 3(b), the FETs 11U, 12U are turned OFF simultaneously. When the FETs 11U, 12U are turned OFF, a power supply from the battery 16 to the winding set 5U is stopped. At this time, an electromotive force for holding the magnetic flux is generated in the winding set 5U. In this mode, a current flows in a route through the diode 13U, the winding set 5U and the diode 14U by this electromotive force. Thus, an energy is regenerated in the battery 16.

In the reflux mode, as shown in FIG. 3(c), the FET 11U is turned OFF, and the FET 12U is turned ON. Even in this state, the power supply from the battery 16 to the windings 5Ua, 5Ub is stopped, and an electromotive force is generated in the windings 5Ua, 5Ub. In this mode, a current flows in a route through the diode 13U, the winding set 5U, the FET 12U by this electromotive force. That is, both ends of the winding set 5U are grounded, and the current refluxes through the aforementioned route during the reflux mode. Incidentally, the FET 11U may be turned ON, and the FET 12U may be turned OFF to perform the reflux mode.

Figure 4:
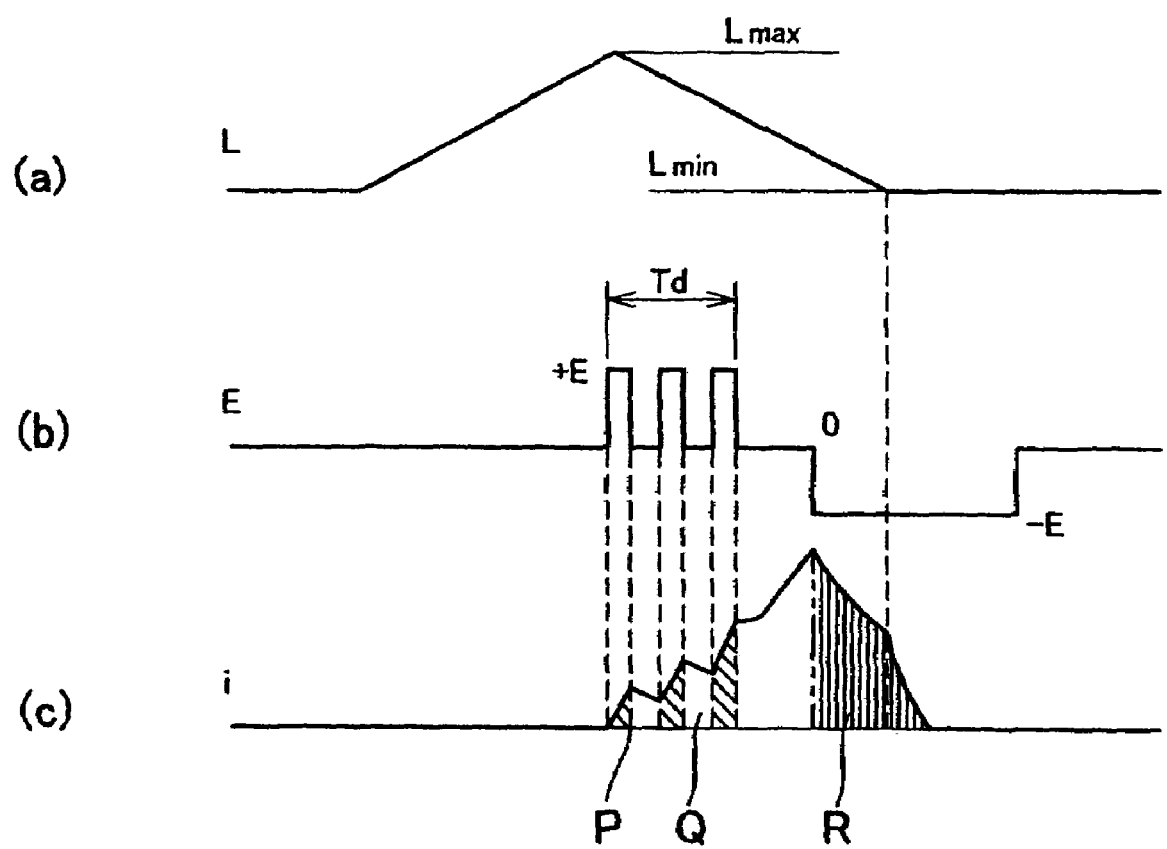
FIG. 4 is an explanatory view showing execution timing of each mode in any one of U-phase, V-phase and W-phase; wherein (a) shows the relationship between a rotary angle of a rotor and an inductance L, (b) shows the relationship between the rotary angle of the rotor and the winding applying voltage, and (c) shows the relationship between the rotary angle of the rotor and the winding current.

In the controlling method of the generator according to the present invention, the above-mentioned three types of the modes are performed as described below. FIG. 4 is an explanatory view showing execution timing of each mode in any one of U-phase, V-phase and W-phase, any of the abscissa axes show a rotary angle of the rotor 3. FIG. 4(a) shows the relationship between the rotary angle of the rotor and the inductance L, FIG. 4(b) shows the relationship between the rotary angle of the rotor and the winding applying voltage, and FIG. 4(c) shows the relationship between the rotary angle of the rotor and the winding current.

As shown in FIG. 4, in this embodiment, when the inductance L becomes the maximum value Lmax (change rate (dL/dθ) of the inductance L is "0"), the power supply to the winding 5 is started. The power supply to the winding 5 is PWM controlled by the gate drivers 15U, 15V and 15W. That is, the supply current rate to the winding 5 is controlled by the continuation time and the duty ratio under the ON/OFF control of the FET 11U or the like, and the alternating mode for alternatively repeating the supply mode and the reflux mode is executed. The continuation time Td of the alternating mode is set in response to the rotational speed of the rotor calculated from the signal of the shaft position sensor 17. At this time, Td can be set by the rotary angle of the rotor, and may be set to a predetermined angle irrespective of the rotational speed or to an angle in response to the rotational speed.

At the supply mode execution time (portion P in FIG. 4(c)) during the alternating mode, the winding current increases, while at the reflux mode execution time (portion Q in FIG. 4(c)), the winding current decreases. Here, the reduction part of the winding current in the reflux mode is smaller than the increase part of the winding current in the supply mode, and during the alternating mode, the PWM duty ratio is set so that the current waveform to generally increases in the sawtooth-like waveform.

After the time Td is elapsed, the CPU 18 stops the PWM control, and only the reflux mode is performed. Thus, the current flowing to the winding 5 increases. After the reflux mode is performed for a predetermined period (or a predetermined rotary angle of the rotor), the regenerative mode is executed. When the regenerative mode is performed, the winding voltage becomes −E, and the winding current i is gradually decreased to become "0" shortly. Thus, an energy of an amount shown by an area of a portion R of FIG. 4(c) is regenerated to the battery 16. Since the amount of the regenerative energy is determined depending upon the current rate at the regenerative mode starting time, the amount of regenerative energy changes according to the duty ratio of the PWM control, a power source voltage, continuation time Td of the alternating mode, reflux mode execution time after the alternating mode, etc. The CPU 18 controls the amount of the regenerative energy by suitably regulating these values.

Further, the CPU 18 always monitors the voltage of the battery 16, and conducts a PI control by a voltage feedback, thereby preventing the battery 16 from being overcharged. In this case, the PWM duty ratio and the continuation time in the alternating mode may be suitably controlled while observing the battery voltage so as to set the battery voltage at a predetermined value. Note that, in the PWM control, stability of the voltage value is important to ensure the control accuracy, and the detection of the battery voltage is also important in this point.

As shown in FIG. 4(c), in the controlling method, since the reflux mode is once executed after the alternating mode, the reflux mode is switched to the regenerative mode in the state in which the winding current rate is increased. Therefore, an amount of the regenerative energy (a area of a portion R) at the regenerative mode execution time (portion R in FIG. 4(c)) can be made large, and a power generating efficiency can be raised. Here, a rising trend of the current rate in the reflux mode is determined depending on the current value and the rotational speed of the rotor at the reflux mode starting time. If they are not sufficiently large, the current value does not increase at the reflux mode time. When the current increase at the reflux mode time is not sufficient, the amount of the regenerative energy in the regenerative mode can not be ensured, therefore the power generating efficiency is lowered. On the contrary, when the winding current is controlled so as to increase the current value at the reflux mode starting time, as a result of this, the brake force increases. In the controlling method of the present embodiment, an average current value in a region for generating a brake force by the winding current is suppressed by the alternating mode, and the current value at the reflux mode starting time can be controlled to become as large as possible while suppressing such a brake force. Therefore, the brake force and the amount of the regenerative energy can be controlled in a well-balanced manner, and the power generating efficiency is improved.

Incidentally, since the SR motor is executed by the PWM control in a normal motoring operation in many cases, the power generation operation can be performed in the above-mentioned control state without introducing a new circuit or control mode. Therefore, the existing apparatus can deal with the controlling method of the present invention, and power generating efficiency can be improved without increasing the cost.

Embodiment 2

Figure 5:
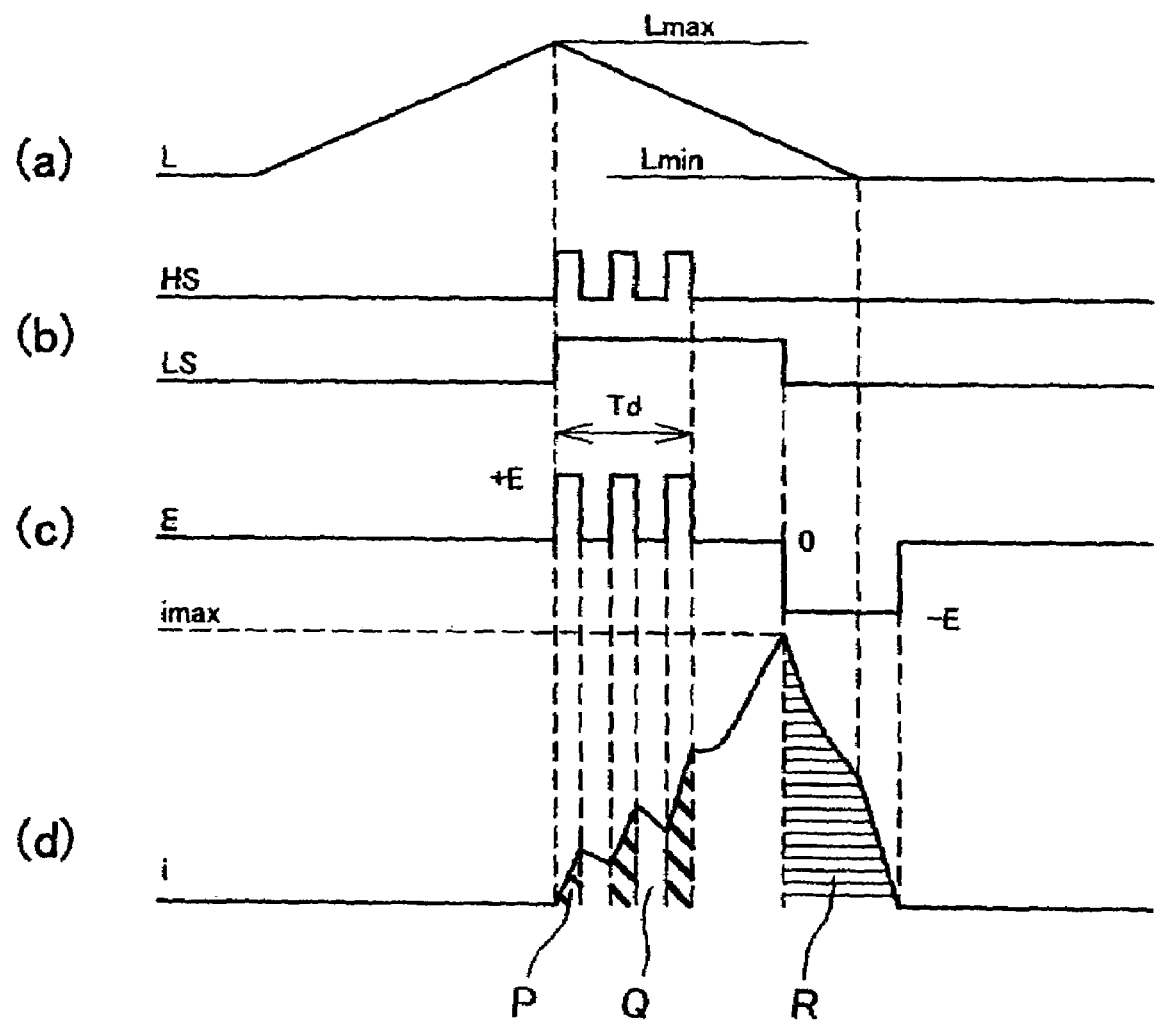
FIG. 5 is an explanatory view showing execution timing of each mode in the controlling method of the embodiment 1; wherein (a) shows the relationship between the rotary angle of the rotor and the inductance L, (b) shows the energizing state of HI side and LO side in the drive circuit, (c) shows the relationship between the rotary angle of the rotor and the winding voltage, and (d) shows the relationship between the rotary angle of the rotor and the winding current.

In the meantime, in order to increase the power generation rate in a control method as in the embodiment 1, it is necessary to increase a winding current value in the alternating mode. To this end, there arises a need to raise the ON duty ratio under the PWM control in an alternating mode time or to lengthen the energizing time. However, when the winding current value in the alternating mode time is increased, there is a problem that the current value in the reflux mode executed after the alternating mode excessively increases. That is, as shown in FIG. 5, the maximum value imax of the winding current value i becomes large. If the winding current value i excessively increases, a load on the power device is increased, and hence elements of large capacity must be used, which thereby increases the cost.

In this case, as in the above-mentioned Japanese Patent Application Laid-Open Publication No. 2001-78490, when the reflux mode and the regenerative mode are switched while monitoring the current value, the excess current can be suppressed, and the load on the power device can be alleviated. However, to monitor the current value, a sensor for detecting the current value and a feedback control circuit operating at a high speed are necessary. That is, when a current monitor system is adopted, the load on the power device can be alleviated but since the sensor, the high-speed comparator, etc., are newly used, the problem of cost increase is still not solved. Therefore, the present inventor has considered the structure of the embodiment to prevent the excessive current generation in the generator of the SR motor structure without increasing the cost.

Figure 6:
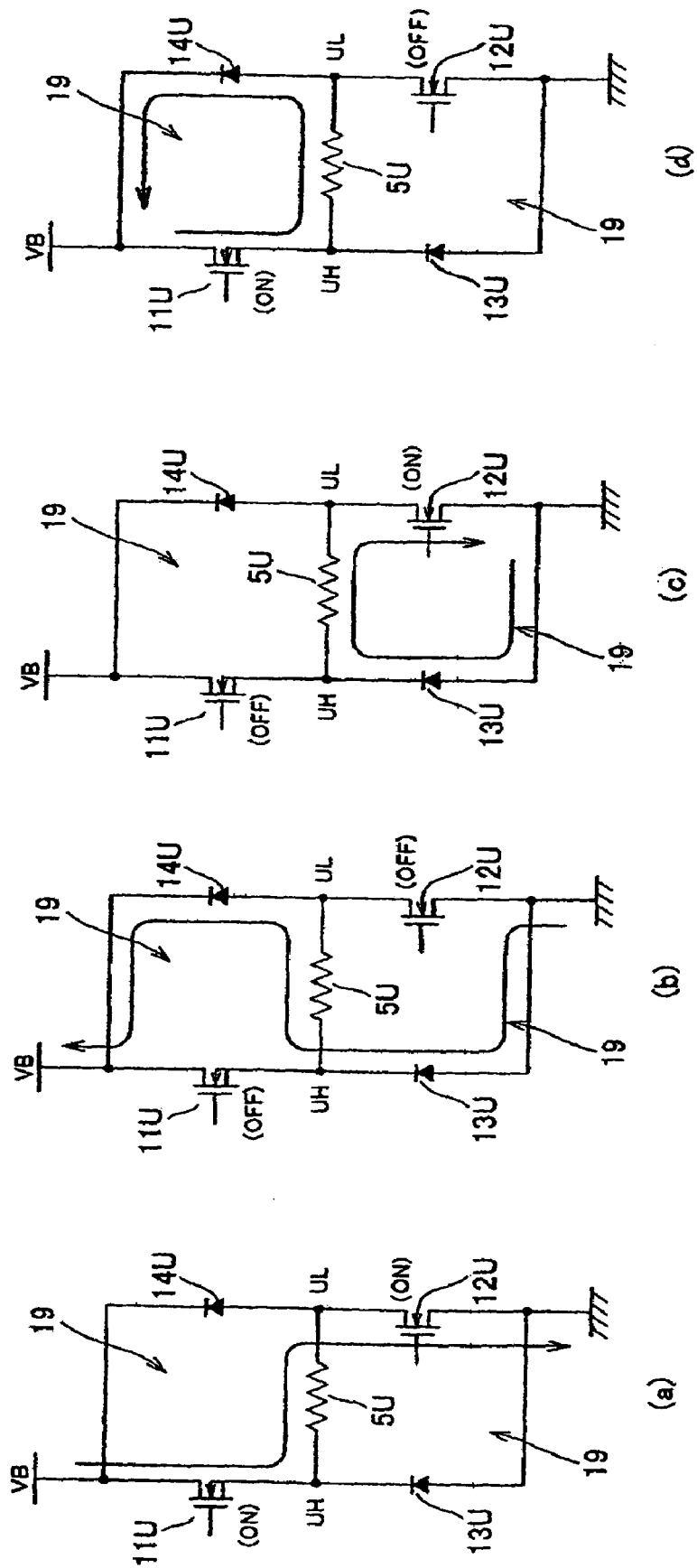
FIG. 6 is a circuit diagram showing only the U-phase portion extracted from the circuit diagram of FIG. 2; wherein (a) shows the supply mode, (b) shows the regenerative mode and (c) and (d) show reflux mode in the controlling method of an embodiment 2.

FIG. 6 is a circuit diagram showing only the U-phase portion extracted from the circuit diagram of FIG. 2; and FIG. 6(a) shows the supply mode, FIG. 6(b) shows the regenerative mode, and FIGS. 6(c) and 6(d) show the reflux mode in the controlling method of the embodiment 2 of the present invention. Incidentally, in the following embodiment, the structures of the generator and its drive circuit are similar to those shown in FIGS. 1 and 2, and the similar members and parts, etc. are designated by the same reference numbers, and therefore the description will be omitted.

In the controlling method of this embodiment, the generator 1 is driven in three control modes including the supply mode, the regenerative mode and the reflux mode. Here, different from the embodiment 1, there are two variations of the reflux mode as shown in FIGS. 6(c) and 6(d). First, in the case of FIG. 6(c), the FET 11U is turned OFF, and the FET 12U is turned ON. Also in this state, the power supply to the windings 5Ua, 5Ub from the battery 16 is stopped, and electromotive forces are generated in the windings 5Ua, 5Ub. In this mode, the current flows in a route through the diode 13U, the winding set 5U and the FET 12U by the electromotive forces. That is, both ends of the winding set 5U are grounded, and the current refluxes through the aforementioned route during the reflux mode.

In the case of FIG. 6(d), the FET 11U is turned ON, and the FET 12U is turned OFF. At this time, both ends of the windings 5Ua, 5Ub are connected to the battery 16 to be the same potential, and an electromotive force is generated in the windings 5Ua, 5Ub. The current flows in the route through the FET 11U, the winding set 5U, and the diode 14U, and the current refluxes the route during the reflux mode.

Figure 7:
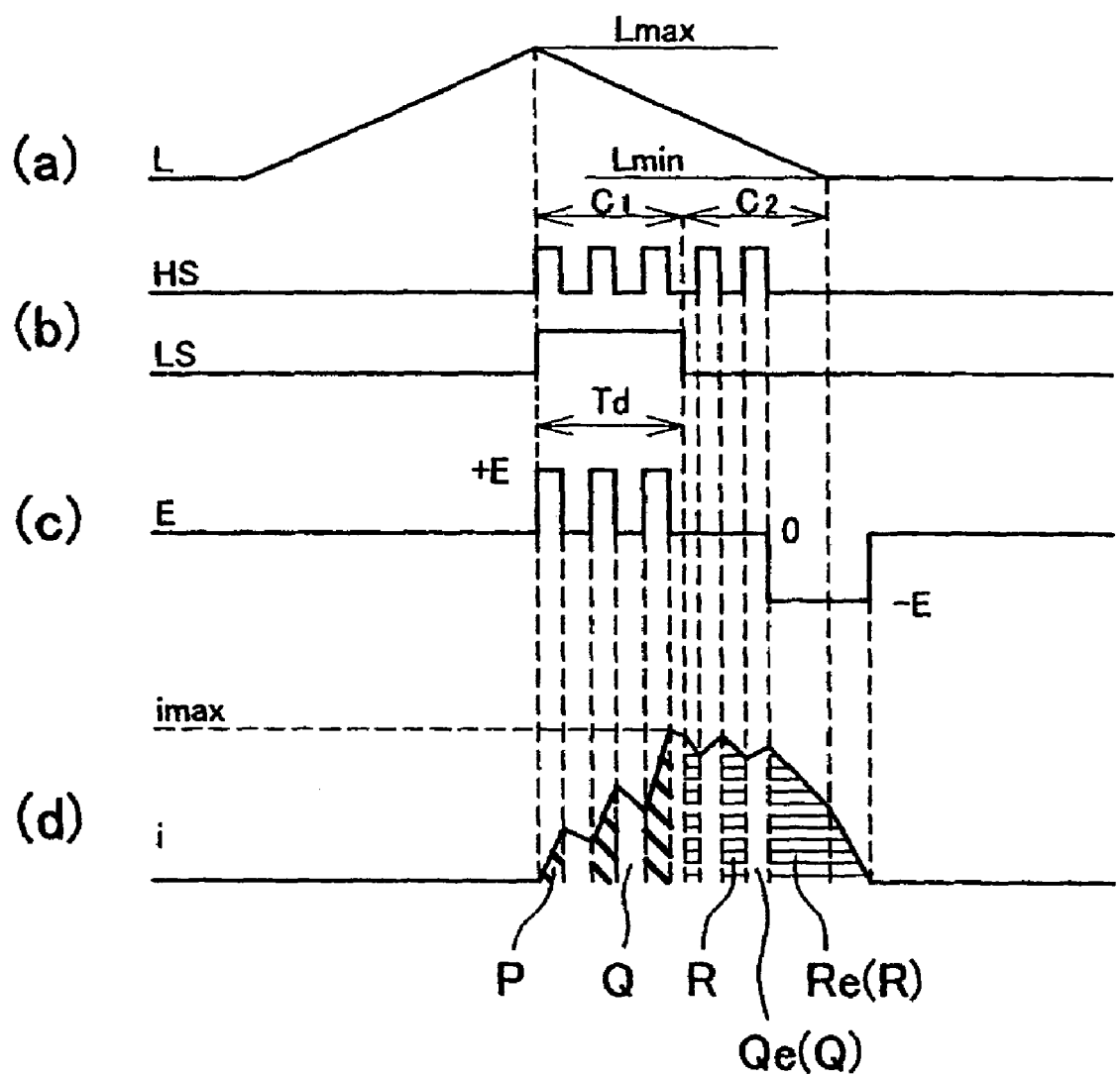
FIG. 7 is an explanatory view showing execution timing of each mode in the controlling method of the embodiment 2 of the present invention; wherein (a) shows the relationship between the rotary angle of the rotor and the inductance L, (b) shows the energizing state of the HI side and the LO side in the drive circuit, (c) shows the relationship between the rotary angle of the rotor and the winding voltage, and (d) shows the relationship between the rotary angle of the rotor and the winding current.

In the controlling method of the generator according to the present invention, the above-mentioned three types of modes are performed as described below. FIG. 7 is an explanatory view showing execution timing of each mode in the U-phase in the controlling method of the embodiment 2 of the present invention. Any of the abscissa axes of FIG. 7 show a rotary angle of the rotor 3. FIG. 7(a) shows the relationship between the rotary angle of the rotor and the inductance L, FIG. 7(b) shows the energizing state of the HI side and the LO side in the drive circuit, FIG. 7(c) shows the relationship between the rotary angle of the rotor and the winding voltage, and FIG. 7(d) shows the relationship between the rotary angle of the rotor and the winding current. Here, the U-phase will be described as an example. However, similar control is performed for the V-phase and the W-phase.

As shown in FIG. 7, in this embodiment, when the inductance L becomes the maximum value Lmax (change rate (dL/dθ) of the inductance L is "0"), the power supply is started to the winding 5. The power supply to the winding 5 is PWM controlled by the gate driver 15U. That is, the supply current rate to the winding 5 is controlled by the continuation time and the duty ratio under the ON/OFF control of the FET 11U or the like, and a first alternating mode $C_1$ for alternatively repeating the supply mode and the reflux mode is performed.

In the first alternating mode $C_1$, the FET 11U of the HI side is controlled by a predetermined duty ratio, and the FET 12U of the LO side is always set to the ON state. When the FET 11U of the HI side is ON, it becomes the state shown in FIG. 6(a), and the supply mode is performed. On the contrary, when the FET 11U of the HI side is OFF, it becomes the state shown in FIG. 6(c), and the reflux mode is executed. The continuation time Td of the first alternating mode $C_1$ is set in response to the rotational speed of the rotor calculated from the signal of the shaft position sensor 17. At this time, Td can be set by the rotary angle of the rotor, or may be set to a predetermined angle irrespective of the rotational speed or to an angle in response to the rotational speed.

During the first alternating mode $C_1$, the winding current increases at the supply mode execution time (portion P in FIG. 7(d)), while the winding current decreases at the reflux mode execution time (portion Q in FIG. 7(d)). In the first alternating mode $C_1$, the reduction part of the winding current in the reflux mode Q is smaller than the increase part of the winding current in the supply mode P, and the PWM duty ratio is set so that the current waveform generally increases in the sawtooth-like waveform during the time Td. After the time Td is elapsed, the CPU 18 switches the operation mode to a second alternating mode $C_2$. In the second alternating mode $C_2$, the reflux mode Q and the regenerative mode (portion R in FIG. 7(d)) are alternately repeated.

The rising trend of the current rate of the reflux mode Q (particularly Qe) in the second alternating mode $C_2$ is determined depending upon the current value and the rotational speed of the rotor at the reflux mode starting time, and if they are not sufficiently large, the current value does not increase at the reflux mode time. When the current increase at the reflux mode time is not sufficient, the amount of the regenerative energy in the regenerative mode cannot be ensured, therefore the power generating efficiency is lowered. On the contrary, when the winding current is controlled so as to increase the current value at the reflux mode starting time, the brake force increases. Therefore, in the controlling method of the present embodiment, an average current value in a region for generating a brake force by the winding current is suppressed by the first alternating mode $C_1$, and the current value at the reflux mode starting time in the second alternating mode $C_2$ can be controlled to become as large as possible while suppressing such a brake force.

In the second alternating mode $C_2$, with use of the PWM control, the FET 11U of the HI side is turned ON/OFF even after the first alternating mode $C_1$, and the reflux mode after executing the first alternating mode $C_1$, is chopped. Here, in the controlling method of the embodiment 1 as shown in FIG. 5, only the reflux mode is performed after the first alternating mode $C_1$ is executed, to increase the winding current, then the regenerative mode is performed to increase the amount of the regenerative current. However, as described above, there is the case in which the winding current increases excessively by the reflux mode after the first alternating mode $C_1$ is carried out, and hence there is a problem that the load on the power device increases.

On the contrary, in the controlling method of the embodiment 2, the reflux mode and the regenerative mode are not merely executed after the first alternating mode $C_1$ is performed, but the reflux mode and the regenerative mode are repeatedly executed, and the increase in the winding current in the reflux mode is suppressed suitably in the regenerative mode. Thus, as compared with the case in which the winding current is simply increased in the reflux mode as shown in FIG. 5, as apparent from FIG. 7, in the controlling method for performing the second alternating mode $C_2$, the maximum current value imax can be suppressed to a low value.

At the final stage of the second alternating mode $C_2$, only the regenerative mode is performed. At the regenerative mode execution time, the winding voltage becomes −E, and in the final regenerative mode Re, the winding current value i is gradually reduced to become "0" shortly. Thus, energy of an amount shown by an area of a portion R of FIG. 7(d) is regenerated to the battery 16. Here, the amount of the regenerative energy in the final regenerative mode Re depends upon the current amount at the regenerative mode Re starting time. Therefore, normally, when the maximum current value imax is suppressed, the amount of the regenerative current in the regenerative mode Re is also reduced. That is, in the regenerative mode Re of FIG. 7, a large area (amount of the regenerative energy) as in the regenerative mode R of FIG. 5, cannot be secured.

However, in the controlling method of the present embodiment, the reflux mode is executed in the second alternating mode $C_2$, and the winding current is increased therein. Further, the regenerative mode R is provided before the regenerative mode Re. Thus, as compared with the case in which the regenerative mode is merely executed after the first alternating mode $C_1$, the amount of the regenerative current is increased for the current increased part due to the reflux mode, and the regenerative current is obtained even in the regenerative mode on the way. Therefore, since the amount of the regenerative energy in the regenerative mode Re is lower than the case shown in FIG. 5, the entire amount of the regenerative energy is sufficiently ensured.

Incidentally, since the amount of the regenerative energy is decided according to the amount of current at the regenerative mode starting time, the amount of the regenerative energy changes according to the duty ratio of the PWM control, the power source voltage, the continuation time Td of the first alternating mode $C_1$, the number of times of alternating after the first alternating mode $C_1$, etc. Therefore, the CPU 18 controls the amount of the regenerative energy by suitably regulating these values. Further, the CPU 18 always monitors the voltage of the battery 16, and performs a PI control by a voltage feedback, thereby preventing the battery 16 from being overcharged. In this case, the PWM duty ratio and the continuation time in the alternating mode may be suitably controlled while observing the battery voltage so as to set the battery voltage at a predetermined value. In the PWM control, stability of the voltage value is important to ensure the control accuracy, and the detection of the battery voltage is also important in this point.

Thus, according to the controlling method of the embodiment 2 of the present invention, the amount of the regenerative current can be ensured to achieve the maximum limit while suitably suppressing the maximum current value imax, and the power generation in a well-balanced manner between them can be performed. Accordingly, a load on the power device is reduced, an element having a large capacity is not required, and the cost can be reduced. Further, the amount of the winding current can be suppressed without adding a current sensor, a high speed comparator or the like, and an increase in cost due to the increase in the number of components can be prevented.

Embodiment 3

Then, as the embodiment 3, the case in which starting timing of the first alternating mode $C_1$ is advanced from a position where the inductance L becomes the maximum value Lmax, will be described. When the control as shown in FIG. 5 is performed, a measure that the executing time Td of the alternating mode is increased, times of a reflux mode and a regenerative mode are relatively reduced, and the maximum current value imax is suppressed, is considered. However, when such a measure is adopted, as the times of the reflux mode and the regenerative mode decrease, there is a possibility that a sufficient amount of power generation cannot be obtained.

Then, starting timing of the alternating mode is advanced to increase an amount of current to a certain degree at the reflux mode starting time after the alternating mode. That is, a control state of advancing an angle may be considered. Particularly, since the winding current becomes an inductance load, even if the first alternating mode is started, the winding current might not rise in an ideal shape as shown in FIG. 7 in many cases. On the other hand, when the first alternating mode $C_1$ is started before the Lmax time point by means of the lead angle, the amount of the winding current can be effectively increased at the Lmax time point, and the power generating efficiency is improved.

Figure 8:
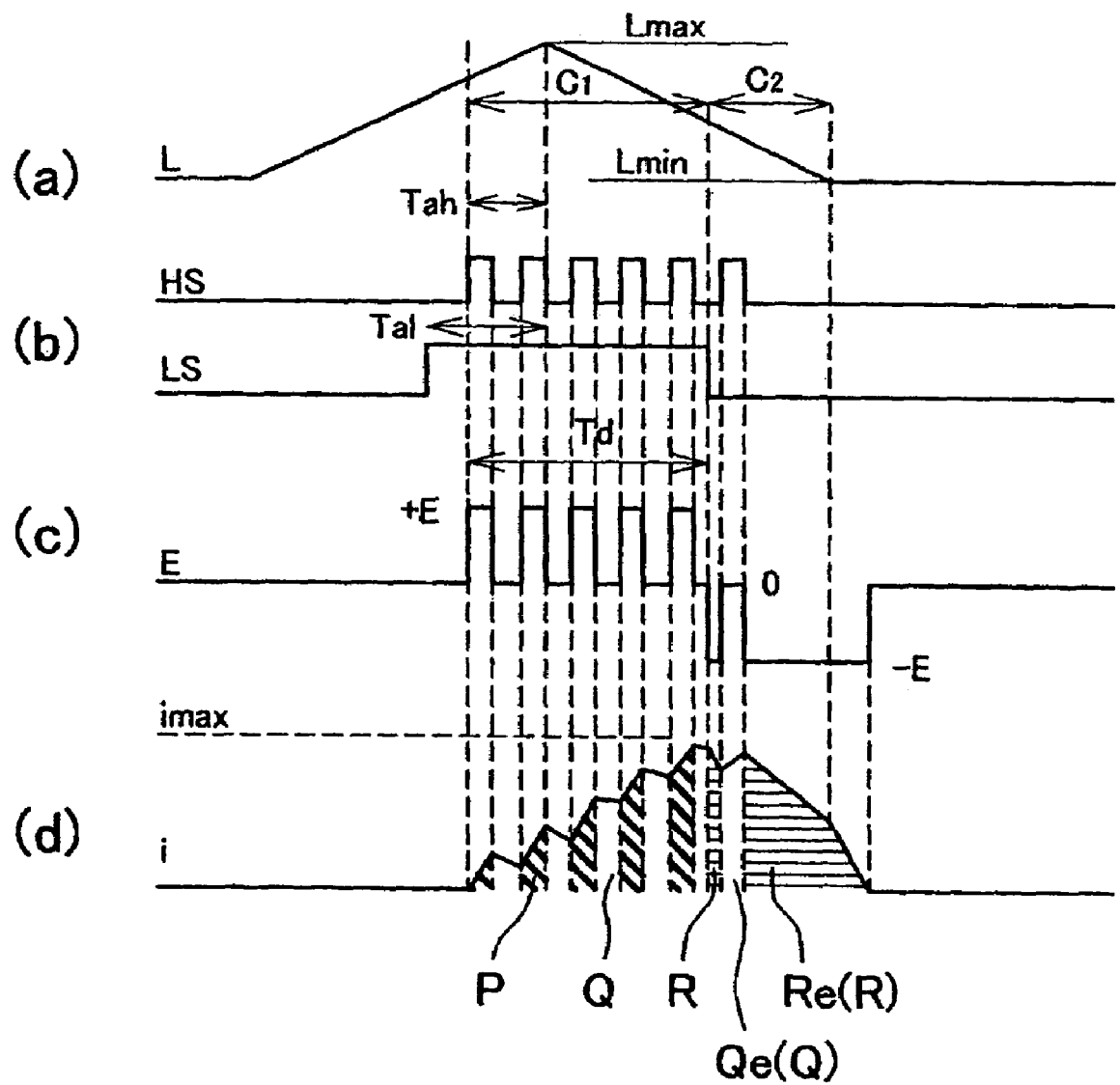
FIG. 8 is an explanatory view showing execution timing of each mode in the controlling method of an embodiment 3 of the present invention; wherein (a) shows the relationship between the rotary angle of the rotor and the inductance L, (b) shows the energizing state of the HI side and the LO side in the drive circuit, (c) shows the relationship between the rotary angle of the rotor and the winding voltage, and (d) shows the relationship between the rotary angle of the rotor and the winding current.

The controlling method of the present invention is effective even when such a lead angle is performed. FIG. 8 is an explanatory view showing execution timing of each mode when the lead angle control is performed, and shows the control state when the above-mentioned lead angle is performed. In FIG. 8, any of the abscissa axes show a rotary angle of a rotor 3 similarly to FIG. 7. FIG. 8(a) shows the relationship between the rotary angle of the rotor and the inductance L, FIG. 8(b) shows the energizing states of the HI side and the LO side in the drive circuit, FIG. 8(c) shows the relationship between the rotary angle of the rotor and the winding voltage, and FIG. 8(d) shows the relationship between the rotary angle of the rotor and the winding current. Here, the U-phase will be described as an example. However, similar control is performed for the V-phase and the W-phase.

As shown in FIG. 8, in this embodiment, before the inductance L becomes the maximum value Lmax, the power supply to the winding 5 is started. In this case, at an FET 11U of the HI side, the power supply is started at a point in time of advancing a time Tah from the time point of Lmax, and at an FET 12U of the LO side, the power supply is started at a point in time of advancing a time Tal from the time point of Lmax. The respective lead angle times Tah, Tal are set corresponding to the amount of the winding current at the time of starting the second alternating mode $C_2$, that is, ON duty ratio of the FET 11U of the HI side. That is, when the ON time is lengthened, the value of the current rise in the first alternating mode $C_1$ is increased, but even when the amount of the winding current at the second alternating mode $C_2$ starting time becomes insufficient, the lead angle control is performed to lengthen the continuation time Td of the first alternating mode $C_1$. In this embodiment, Tal>Tah is set, but the Tal and the Tah may be the same time (Tal=Tah).

The first alternating mode $C_1$ is started from a point in time (time Tah lead angle position) when the FET 11U of the HI side is turned ON. The first alternating mode $C_1$ is executed under the PWM control by the gate driver 15U, similarly to the embodiment 2, and a supply mode P and a reflux mode Q are alternately repeated. After the time Td is elapsed, the CPU 18 switches the operation mode to a second alternating mode $C_2$. In the second alternating mode $C_2$, similarly to the embodiment 1, the reflux mode Q and the regenerative mode R are alternately repeated to thereby suppress the maximum current value imax.

In the controlling method of this embodiment, since the continuation time Td of the first alternating mode $C_1$ is lengthened by means of the lead angle, the amount of current at the second alternating mode $C_2$ starting time is increased. Thus, as shown in FIG. 7, it is effective when the first alternating mode $C_1$ is started from the Lmax time point, and the amount of the power generation becomes in short supply. As the same time, in the second alternating mode $C_2$, since the increase in the amount of current is suppressed, the excess increase in the amount of the winding current in the reflux mode can be suppressed.

According to the controlling method of the embodiment 3, by combining the increase in the amount of current by means of the lead angle and the suppression of the amount of current in the second alternating mode $C_2$ in a well-balanced manner, the preferable control state capable of sufficiently securing the amount of the regenerative current can be realized while suppressing the maximum current value imax. Therefore, the amount of the power generation can be increased while the increase in the load on the power device is suppressed to the minimum limit, and a cost rise due to the use of a large capacity element can be prevented. Further, the amount of the winding current can be suppressed without adding a current sensor, a high-speed comparator or the like, and an efficient power generation can be performed without increasing the cost.

The present invention is not limited to the above-described embodiments, and various changes and modifications may be made without departing from the spirit and scope of the present invention.

For example, in the above-described embodiment, at the time point that the inductance L becomes the maximum value Lmax, the alternating mode is started. However, the alternating mode can be started from not exactly the Lmax time point but its vicinity. When the rotor 3 rotates at a high speed, it is difficult to secure a current value at the reflux mode starting time. Therefore, a lead angle control for starting the alternating mode before the maximum value Lmax position may be performed to increase the current value. Accordingly, the alternating mode continuation time can be secured longer, and the current value at the reflux mode starting time can be raised, and it is particularly effective when the voltage generation is low.

In the above-described embodiment, the battery voltage is monitored by the CPU 18. However, a current amount detector may be provided in the control circuit, and the current amount is monitored to set the duty ratio of the PWM control, the alternating mode continuation time Td, the reflux mode execution time after the alternating mode, and so on. Note, however, that the voltage detection is generally easy as compared with the current amount detection, and the voltage detection is advantageous in cost.

Furthermore, in the embodiments 2 and 3, the case that the duty ratio of the FET 11U of the HI side is set similarly in the first alternating mode $C_1$ and the second alternating mode $C_2$, has been described. However, the duty ratios in the modes $C_1$ and $C_2$ may be set to different values. In addition, the embodiments 2 and 3 are described for the case in which the FET of the HI side is used for the PWM drive, and the FET of the LO side is used for a phase control. However, the FET of the LO side may be used for the PWM drive and the FET of the HI side may be used for the phase control.

On the one hand, the generator according to the present invention may be used as a power generation facility of a wind power generator. In the wind power generator, rotary blades are operated by wind power to conduct power generation, and a large wind power is required at the starting time of the rotary blade. A generator cannot be started if the wind does not have a wind speed of a certain degree. Therefore, in the case of a slight breeze that does not satisfy a wind speed capable of starting the rotary blade, there is a problem that power generation cannot be performed even if the wind blows.

In that case, this generator can be used as an SR motor. It is possible to use the generator as a motor to start the rotary blade, and after the rotary blade is once started, to use the generator as a generator. Therefore, even in the case of the above-mentioned slight breeze, the rotary blade can be started by the motor, and thereafter the rotary blade can be rotated by the wind power. In this case, the using time of the generator as the motor is short, and acquisition energy by the power generation thereafter is much larger. Thus, the wind power generator can be operated from the slight breeze state, and the power generating efficiency can be improved.

The invention claimed is:

1. A method of controlling a generator including a stator having a plurality of salient poles, a rotor having a plurality of salient poles of a number different than a number of the salient poles of the stator, and a winding wound around the stator, said method comprising:
   executing a first alternating mode by alternately repeating a supply mode for supplying power from a power source to the winding and a reflux mode for setting both ends of the winding to the same potential; and
   after said first alternating mode, executing a second alternating mode by alternately repeating the reflux mode and a regenerative mode for recovering in the power source an electromotive force generated in the winding.

2. The controlling method of claim 1, wherein said first alternating mode and said second alternating mode are executed by controlling the generator using a switching circuit having a switching element and a diode connected to both ends of the winding, the switching element being PWM controlled to execute said first alternating mode and said second alternating modes.

3. The controlling method of claim 2, further comprising detecting a voltage of the power source, and a continuation time of at least one of the supply mode and the reflux mode is controlled based on the detected voltage value.

4. The controlling method of claim 2, wherein said first alternating mode comprises starting the supply mode at a time point when an inductance of the winding becomes maximum or at the vicinity thereof.

5. The controlling method of claim 2, wherein said first alternating mode is started before a time point when the inductance of the winding becomes maximum.

6. The controlling method of claim 1, wherein said first alternating mode is started before a time point when the inductance of the winding becomes maximum.

7. The controlling method of claim 6, further comprising detecting a voltage of the power source, and a continuation time of at least one of the supply mode and the reflux mode is controlled based on the detected voltage value.

8. The controlling method of claim 6, wherein said first alternating mode comprises starting the supply mode at a time point when an inductance of the winding becomes maximum or at the vicinity thereof.

9. The controlling method of claim 1, further comprising detecting a voltage of the power source, and a continuation time of at least one of the supply mode and the reflux mode is controlled based on the detected voltage value.

10. The controlling method of claim 9, wherein said first alternating mode comprises starting the supply mode at a time point when an inductance of the winding becomes maximum or at the vicinity thereof.

11. The controlling method of claim 1, wherein said first alternating mode comprises starting the supply mode at a time point when an inductance of the winding becomes maximum or at the vicinity thereof.

* * * * *